United States Patent
Avery et al.

(10) Patent No.: US 9,141,623 B2
(45) Date of Patent: Sep. 22, 2015

(54) SYSTEM FOR ON-LINE ARCHIVING OF CONTENT IN AN OBJECT STORE

(75) Inventors: Kenytt D. Avery, Newport Beach, CA (US); Edward L. Bader, Los Angeles, CA (US); Kevin N. Trinh, Garden Grove, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/566,314

(22) Filed: Aug. 3, 2012

(65) Prior Publication Data

US 2014/0040210 A1 Feb. 6, 2014

(51) Int. Cl.
*G06F 7/00* (2006.01)
*G06F 17/00* (2006.01)
*G06F 17/30* (2006.01)

(52) U.S. Cl.
CPC .... *G06F 17/30073* (2013.01); *G06F 17/30091* (2013.01)

(58) Field of Classification Search
USPC .......... 707/600, 609, 661, 662, 665, 667, 671
See application file for complete search history.

(56) References Cited

U.S. PATENT DOCUMENTS

| | | | |
|---|---|---|---|
| 5,530,899 A | 6/1996 | MacDonald | |
| 6,269,382 B1 * | 7/2001 | Cabrera et al. | 1/1 |
| 6,826,724 B1 | 11/2004 | Shimada et al. | |
| 7,483,926 B2 | 1/2009 | Chandhok et al. | |
| 7,751,628 B1 * | 7/2010 | Reisman | 382/232 |
| 7,865,560 B2 | 1/2011 | Rohall et al. | |
| 8,015,158 B1 | 9/2011 | Mankovsky et al. | |
| 8,108,635 B2 | 1/2012 | Bitar et al. | |
| 8,140,301 B2 | 3/2012 | Abe et al. | |
| 8,140,786 B2 | 3/2012 | Bunte et al. | |
| 8,141,074 B2 | 3/2012 | Fisher et al. | |
| 8,375,446 B2 | 2/2013 | Eiland et al. | |
| 2004/0024720 A1 | 2/2004 | Fairweather | |
| 2007/0112824 A1 | 5/2007 | Lock et al. | |
| 2007/0266056 A1 * | 11/2007 | Stacey et al. | 707/203 |
| 2008/0065703 A1 * | 3/2008 | Wang et al. | 707/203 |
| 2008/0104150 A1 | 5/2008 | Moore et al. | |
| 2008/0109448 A1 | 5/2008 | Aboel-Nil et al. | |
| 2008/0114806 A1 | 5/2008 | Kosche | |
| 2008/0270077 A1 | 10/2008 | Ozonat et al. | |

(Continued)

OTHER PUBLICATIONS

Agarwala, Sandip et al., iCostale: Adaptive Cost Optimization for Storage Clouds, 2011 IEEE International Conference on Cloud Computing (CLOUD), Jul. 2011, pp. 436-443, IEEE Computer Society, Washington, D.C., United States.

(Continued)

*Primary Examiner* — Robert Beausoliel, Jr.
*Assistant Examiner* — Nicholas Allen
(74) *Attorney, Agent, or Firm* — Patterson & Sheridan, LLP

(57) ABSTRACT

Method, system, and computer program product to archive data objects, by providing an object store and a shadow object store each configured to store one or more data objects, the object store and the shadow object store residing in different storage devices, creating a first object stored in the object store, the first object having at least one attribute, and responsive to receiving a request to archive the first object, transferring the first object to the shadow object store, and creating, in the object store, a reference to a location of the first object in the shadow object store, the first object remaining accessible through the object store and the shadow object store following the transfer.

14 Claims, 5 Drawing Sheets

(56) References Cited

U.S. PATENT DOCUMENTS

| | | |
|---|---|---|
| 2010/0100774 A1 | 4/2010 | Ding et al. |
| 2010/0107255 A1 | 4/2010 | Eiland et al. |
| 2010/0138392 A1 | 6/2010 | Carroll et al. |
| 2010/0268690 A1* | 10/2010 | Anderson et al. ............ 707/661 |
| 2010/0306236 A1* | 12/2010 | Cychosz et al. ............ 707/664 |
| 2010/0318500 A1* | 12/2010 | Murphy et al. ............ 707/693 |
| 2010/0332401 A1 | 12/2010 | Prahlad et al. |
| 2010/0332456 A1* | 12/2010 | Prahlad et al. ............ 707/664 |
| 2011/0029469 A1 | 2/2011 | Yamada |
| 2011/0035359 A1 | 2/2011 | Bendakovsky et al. |
| 2011/0225123 A1 | 9/2011 | D'Souza et al. |
| 2011/0271146 A1 | 11/2011 | Mork et al. |
| 2011/0302194 A1 | 12/2011 | Gonzalez et al. |
| 2012/0059797 A1* | 3/2012 | Prahlad et al. ............ 707/652 |
| 2012/0179779 A1* | 7/2012 | Awasthi ............ 709/217 |
| 2012/0254333 A1 | 10/2012 | Chandramouli et al. |
| 2013/0073490 A1 | 3/2013 | Baughman et al. |
| 2013/0138428 A1 | 5/2013 | Chandramouli et al. |
| 2013/0159248 A1 | 6/2013 | Mueller |
| 2013/0245793 A1 | 9/2013 | Akiyama et al. |

OTHER PUBLICATIONS

Wang, Baohua et al., An Enterprise Security Search System Based on Multilevel Sharing-group Access Control, The 2nd IEEE International Conference on Information Management and Engineerings (ICIME), Apr. 2010, pp. 212-216, IEEE Computer Society, Washington, D.C., United States.

U.S. Appl. No. 13/886,823, entitled System for On-Line Archiving of Content in an Object Store, filed May 3, 2013.

* cited by examiner

SYSTEM FOR ON-LINE ARCHIVING OF CONTENT IN AN OBJECT STORE

BACKGROUND

Embodiments disclosed herein relate to the field of computer software. More specifically, embodiments disclosed herein relate to on-line archiving of content in an object store.

When storing content in an enterprise content management (ECM) repository, users may wish to apply different storage policies to different classes of content. For example, recently used content might be stored on smaller, local, faster disk storage, while older content might be moved to slower, less expensive, higher volume storage. Different storage areas may have different cost, performance, and availability characteristics, and different backup policies.

Storage areas with different performance characteristics may have different cost structures associated with them, and the costs may be associated with the division or line of business in order to charge for usage. As a result, privileged users, such as managers, may need control of document storage characteristics in making cost decisions when using the repositories.

In some ECM repositories, this problem may be addressed by creating a storage area in a different location and applying a storage policy, but such storage policies must be defined ahead of time, and cannot be applied to individual content items. Another approach is to use a hierarchical storage management product. However, such a solution often requires additional up-front configuration, is not user-configurable for individual objects, and may limit the storage to a fixed content device. Additionally, items on backup storage may not be available for retrieval or content search.

SUMMARY

Embodiments disclosed herein provide a method, system, and computer program product to archive data objects. For example, a method to archive data objects may include providing an object store and a shadow object store each configured to store one or more data objects. The object store and the shadow object store may each reside in different storage devices. This method may also include creating a first object stored in the object store, the first object having at least one attribute. This method may also include responsive to receiving a request to archive the first object, transferring the first object to the shadow object store and creating, in the object store, a reference to a location of the first object in the shadow object store. The first object remains accessible through the object store and the shadow object store following the transfer.

BRIEF DESCRIPTION OF THE DRAWINGS

So that the manner in which the above recited aspects are attained and can be understood in detail, a more particular description of embodiments of the disclosure, briefly summarized above, may be had by reference to the appended drawings.

It is to be noted, however, that the appended drawings illustrate only typical embodiments of this disclosure and are therefore not to be considered limiting of its scope, for the disclosure may admit to other equally effective embodiments.

DETAILED DESCRIPTION

Figure 1A:
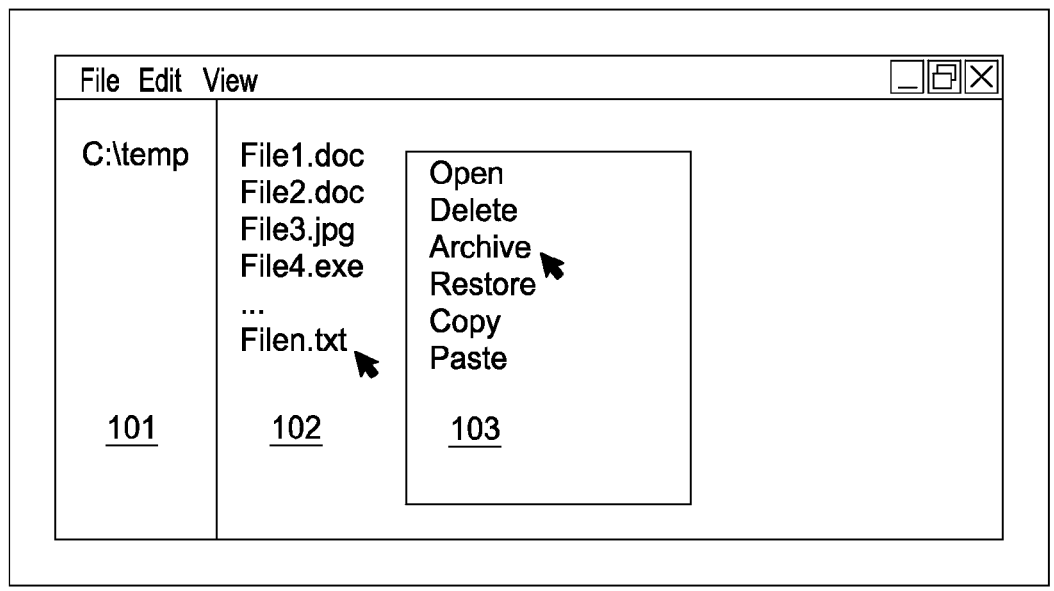
FIGS. 1A-1B are schematics illustrating a graphical user interface (GUI) for on-line archiving of content in an object store, according to one embodiment disclosed herein.

Embodiments disclosed herein provide techniques to archive (and manage archived) data objects. An object store, which may reside on faster, more expensive storage, is used as a primary store for data objects. A shadow object store, which may reside on slower, less expensive storage, is created to mirror the contents of the object store. An interface may be provided to allow specified users to archive the data objects from the object store to the shadow object store. When the object is archived, a pointer object to the object's location in the shadow object store is created and saved in the object store. Objects remain accessible and searchable through both the object store and the shadow object store. Users are also provided the ability to restore items from the shadow object store to the object store. Administrators are able to determine usage of each type of storage, and calculate costs based on such usage.

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access applications to archive content or related data available in the cloud. For example, the archive application could execute on a computing system in the cloud and archive data from an object store to a shadow object store. In such a case, the archive application could access an object in the object store and store the object in the shadow object store at a storage location in the cloud. Doing so allows a user to access this information from any computing system attached to a network connected to the cloud (e.g., the Internet).

FIG. 1A is a schematic illustrating a graphical user interface (GUI) 100 for on-line archiving of content in an object store, according to one embodiment disclosed herein. As used herein, "object store" may refer to any data storage device configured to store digital content. Generally, the GUI 100 depicts a listing of files in a folder of an object store, which may be a local hard drive. Element 101 indicates a folder (also referred to as a directory) within the object store, in this case, "c:\temp", and element 102 indicates a list of files contained in the folder. As shown, a plurality of files are listed in element 102. When a user selects and right clicks on a file, a popup menu 103 is presented, which includes a plurality of actions the user may apply to the file. In this example, the user has right clicked "Filen.txt", which caused the menu 103 to be displayed. As shown, the menu 103 includes an option to archive the file, which is being selected by the user. The archive operation may take the file from the storage device in which the object store containing "c:\temp" resides, and transfer it to another storage device for archiving, also referred to as a shadow object store. A "shadow object store," as used herein, may refer to any data storage device configured to store digital content. Upon archiving the file to the shadow object store, a pointer to the file on the shadow object store may be placed on the object store containing "c:\temp". Additionally, details about the file and the storage location may be maintained along with the pointer in the "c:\temp" object store. Although a right click is used in this example, any number of suitable methods for displaying a menu capable to provide input may be used.

Figure 1B:
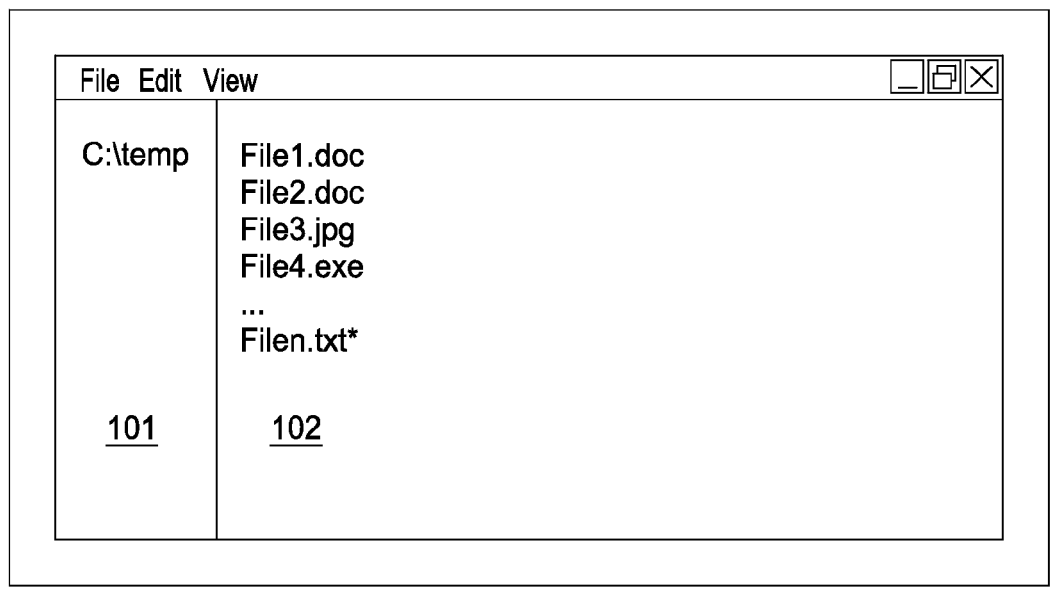

FIG. 1B is a schematic illustrating the GUI 100 after the file "Filen.txt" has been archived pursuant to the archive command issued by the user. As shown, the file "Filen.txt" still appears in the enumeration of files 102, however it is marked with an asterisk "*", which indicates that the file has been archived. Although an asterisk is used in the depicted example, it is broadly contemplated that any visual indicator may be used to show that the file has been archived, such as displaying the filename in a lighter font relative to the other filenames. In some embodiments, the shadow object store has different characteristics from the object store. For example, the object store may be a relatively small and fast solid state drive (SSD) compared to a slower and larger capacity shadow object store operating on a remote array of hard drives. Based on these characteristics, a user may decide to archive a file that may not be frequently used to the shadow object store to free resources on the speedier yet smaller object store. For instance, a department head may be able to reduce storage costs for their departments by deciding which items should be archived to a corporate shadow object store and which items should be retained in the object store.

Embodiments disclosed herein offer this additional flexibility compared to existing fixed content device support. Moreover, embodiments operate independently of the type of storage media used, all content operations remain available, users retain control of which objects are archived, and the storage decision is not permanent (i.e. objects can be moved back to their original storage area). Additionally, the archived content and content searching operations are fully available because the items remain available even after being archived to the shadow object store.

Figure 2:
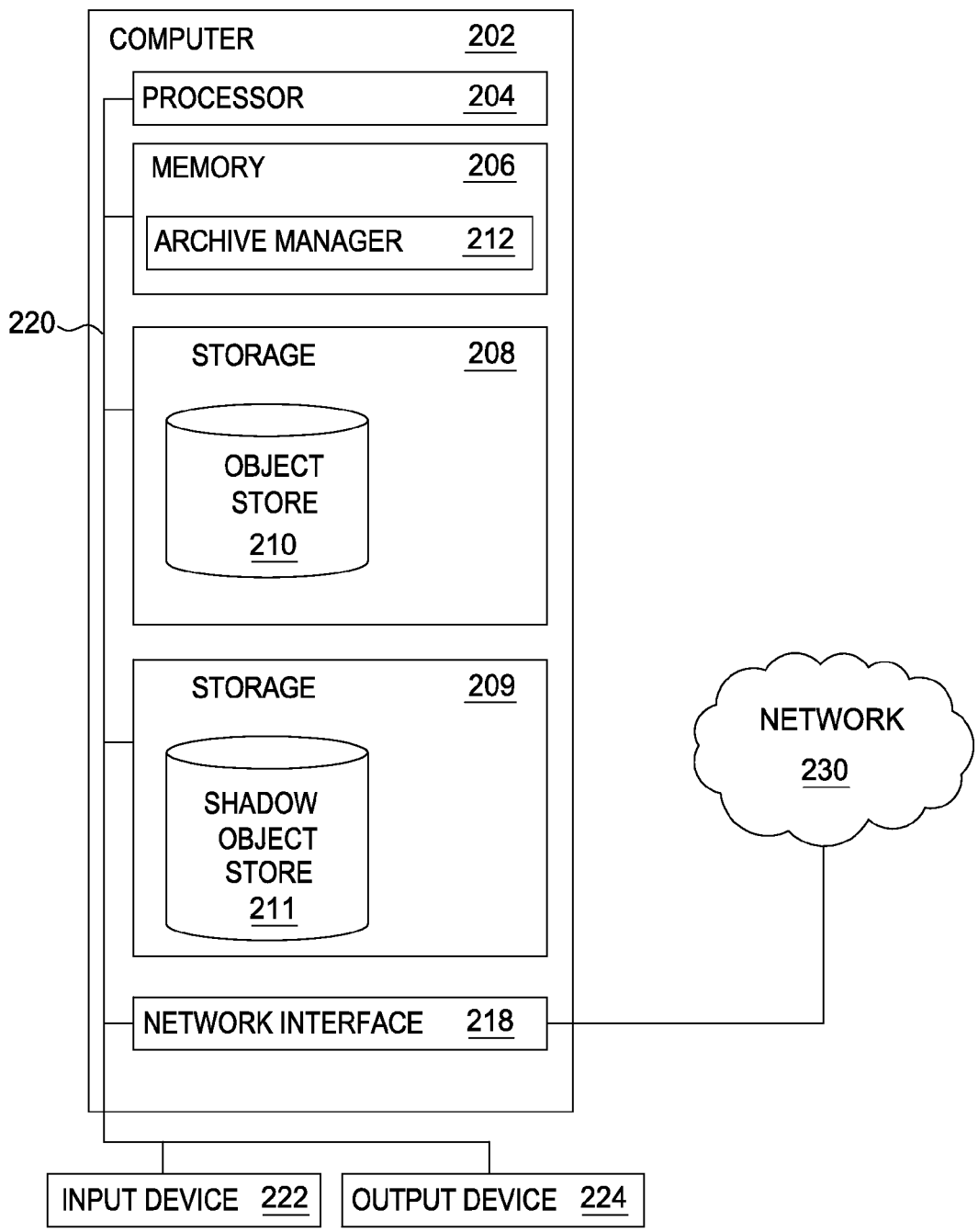
FIG. 2 is a block diagram illustrating a system for on-line archiving of content in an object store, according to one embodiment disclosed herein.

FIG. 2 is a block diagram illustrating a system 200 for on-line archiving of content in an object store, according to one embodiment disclosed herein. The system 200 includes a computer 202. The computer 202 may also be connected to other computers via a network 230. In general, the network 230 may be a telecommunications network and/or a wide area network (WAN). In a particular embodiment, the network 230 is the Internet.

The computer 202 generally includes a processor 204 connected via a bus 220 to a memory 206, a network interface device 218, a storage 208, a storage 209, an input device 222, and an output device 224. The computer 202 is generally under the control of an operating system (not shown). Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 204 is included to be representative of a single CPU, multiple CPUs, a single CPU having multiple processing cores, and the like. Similarly, the memory 206 may be a random access memory. While the memory 206 is shown as a single identity, it should be understood that the memory 206 may comprise a plurality of modules, and that the memory 206 may exist at multiple levels, from high speed registers and caches to lower speed but larger DRAM chips. The network interface device 228 may be any type of network communications device allowing the computer 202 to communicate with other computers via the network 230.

The storage 208 and storage 209 may be a persistent storage device. Although shown as a single unit, the storages 208-209 may be a combination of fixed and/or removable storage devices, such as fixed disc drives, solid state drives, floppy disc drives, tape drives, removable memory cards or optical storage. The memory 206 and the storage 208-209 may be part of one virtual address space spanning multiple primary and secondary storage devices.

As shown, the memory 206 contains the archive application 212, which is an application generally configured to archive objects (such as files, emails, or any type of digital content) from an object store to a shadow object store while making the object remain visible in the object store. The archive application 212 may also restore archived objects, perform update/delete operations, support searches of objects, and return objects to applications. As shown, storage 208 contains the object store 210, which stores data objects such as files, emails, or any type of digital content. As shown, the storage 209 contains the shadow object store 211, which is used as an archive for objects in the object store 210. Although depicted as a database, the archive application 212, the object store 210 and shadow object store 211 may take any form sufficient to store objects, including text files, xml data files, and the like. Although depicted as residing in the same computer, the storage 208, the storage 209, the object store 210, and shadow object store 211 may each reside in different computers or storage devices.

The input device 222 may be any device for providing input to the computer 202. For example, a keyboard and/or a mouse may be used. The output device 224 may be any device for providing output to a user of the computer 202. For example, the output device 224 may be any conventional display screen or set of speakers. Although shown separately from the input device 222, the output device 224 and input device 222 may be combined. For example, a display screen with an integrated touch-screen may be used. Alternatively, the input device 222, the output device 224 may reside in different computers than the archive application 212.

Figure 3:
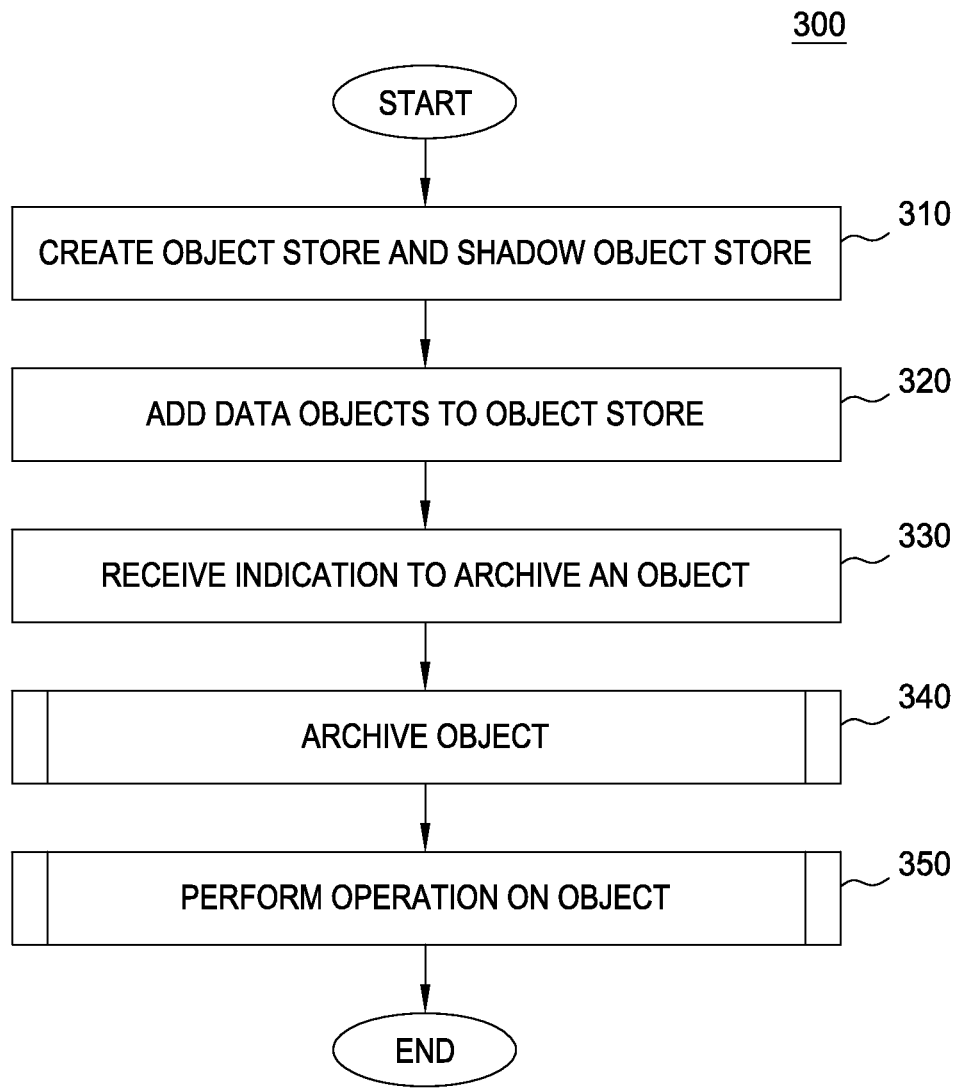
FIG. 3 is a flow chart illustrating a method for on-line archiving of content in an object store, according to one embodiment disclosed herein.

FIG. 3 is a flow chart illustrating a method 300 for on-line archiving of content in an object store, according to one embodiment disclosed herein. The method 300 generally provides an object store and a shadow object store for on-line archiving of content, which may then be operated on by different users and applications. In some embodiments, the steps of the method 300 are performed by the archive application 212. At step 310, the archive application 212 creates an object store and a shadow object store. Generally speaking, when an object store is created, for example, on a user's hard drive, a shadow object store is also created. The two object stores may be created in locations with different storage characteristics, such as speed, size, and the like. Furthermore, the shadow object store may be in a separate storage device, which may be housed in a separate computing system. For example, the object store may be on a local, fast, low capacity hard drive, such as a solid state drive, and the shadow object store may be on a remote, larger, and slower disk system. At step 320, a user or program adds data objects to the object store. For example, a user may create documents, spreadsheets, images, and videos on the object store. The user could also save executables and install applications to the object store. A user may view the objects in the object store via a graphical user interface, and instruct the archive application 212 to archive an object in the object store. At step 330, the archive application 212 receives an indication from the user to archive an object (or objects) from the object store. At step 340, discussed in greater detail with reference to FIG. 4, the archive application 212 archives the object to the shadow object store, which may include transferring the object to the shadow object store, and creating a pointer to the location of the object in the shadow object store. At step 350, and as discussed in greater detail with reference to FIG. 5, an operation is performed on an object, such as a restore operation, a delete operation, or a search. By configuring an object store and a shadow object store in this manner, archived objects remain fully available to users browsing the object store because the items are accessible via the pointer to the object in the shadow object store.

Figure 4:
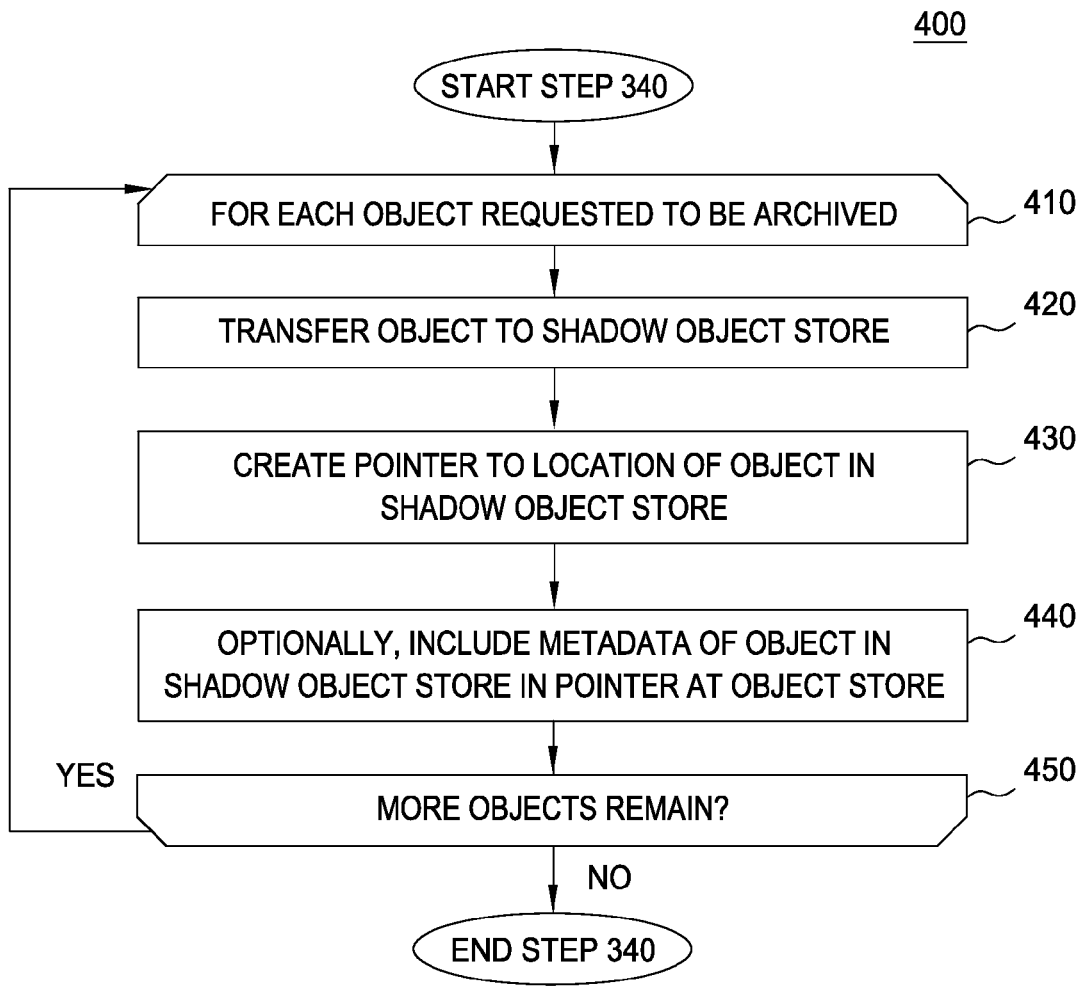
FIG. 4 is a flow chart illustrating a method for archiving content from an object store to a shadow object store, according to one embodiment disclosed herein.

FIG. 4 is a flow chart illustrating a method 400 corresponding to step 340 for archiving content from an object store to a shadow object store, according to one embodiment disclosed herein. By performing the steps of the method 400, digital content stored in the object store may be archived to the shadow object store while the file systems housed on the object store and shadow object store are "online," i.e., accessible by end users during the archival process. Furthermore, the end users, not system administrators, are able to make the decision as to what files should be archived, stored, deleted, and the like. In some embodiments, the archive application 212 performs the steps of the method 400. At step 410, a loop including steps 420-450 begins for each object requested to be archived. At step 420, the archive application 212 transfers to the shadow object store. Upon transferring the object to the shadow object store, the object is no longer stored on the object store, but is instead stored on the shadow object store, where it receives its own metadata (including a unique identifier), location and the like. Additionally, the object in the shadow object store may maintain a reference back to its pointer representing the object in the original object store. At step 430, the archive application 212 creates a pointer object to the location of the object in the shadow object store on the object store. Additionally, the archive application 212 could be configured to create the pointer object in the same location within the object store (i.e., in the same directory within the directory structure of the object store) as the object was originally stored on the object store. For example, assume that the object requested to be archived is named "File1.doc" that the object is stored on the object store at the location of "C:\temp". In such an example, the archive application 212 could be configured to transfer the object "File1.doc" to the shadow object store and to create a pointer object for the object "File1.doc" at the location of "C:\temp" on the object store.

Generally, the pointer object may take the same basic structure as any other object stored on the object store, having a file name (which may be the same as the object being archived), its own unique identifier in the context of the object store's filesystem, as well as other metadata attributes. The contents of the pointer object include at least a pointer to the location of the object in the shadow object store sufficient to direct applications to the correct location of the object when it is needed. For example, the location information in the pointer object may specify an IP address of the shadow object store, as well as disk information such as sectors and cylinders of the location of the object on the shadow object store. The pointer may also contain a unique identifier of the object in the shadow object store. At step 440, metadata of the object in the shadow object store may optionally be included in the pointer, which may include, but is not limited to, properties such as size, creation/modification dates, and authors of the file. By including metadata of the object in the shadow object store in the pointer, certain processes such as searches may be executed on the faster media hosting the object store, rather than the slower, remote shadow object store. At step 450, a determination is made as to whether more objects remain to be archived. If more objects remain, the method returns to step 410. Otherwise, the method 400 ends.

Figure 5:
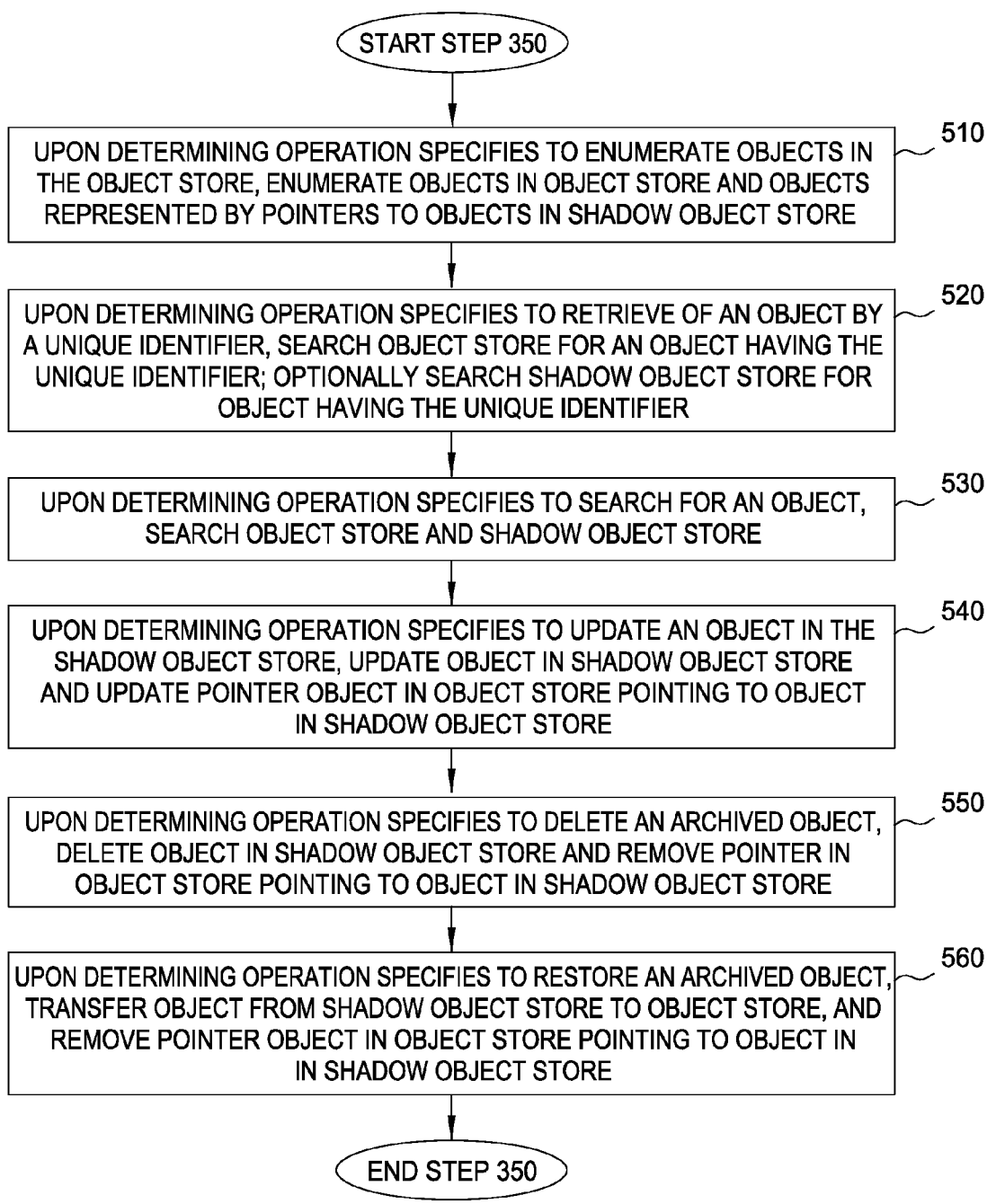
FIG. 5 is a flow chart illustrating a method for performing an operation on archived content in a shadow object store, according to one embodiment disclosed herein.

FIG. 5 is a flow chart illustrating a method 500 corresponding to step 350 for performing an operation on archived content in a shadow object store, according to one embodiment disclosed herein. The steps of the method 500 generally illustrate different operations which may be requested to be performed on an object residing on the object store or the shadow object store. Therefore, although depicted as a flow chart, each step of the method 500 may not need to be completed when a particular operation is requested.

Embodiments disclosed herein, in providing an "online" archival solution, make objects accessible via the object store and the shadow object store. Whenever an operation on an object is requested, different steps may be taken to accommodate the online archival solution. As for general application implementations, at least two approaches may be taken. In the first approach, the shadow object stores are implemented using application logic, where new applications need to be aware of the archiving operation and its implications, and would need to implement the operations themselves. In order to avoid implementing the operations separately in every application, a library implementing these operations may be provided, and the new applications may make calls to functions within the library rather than implementing these functions themselves. Older applications may execute as usual, except that archived objects may not be available if the applications are not updated.

A second approach would handle object pointers transparently through an application program interface (API). The API implementation would be monitored and updated, but client applications would not (with the possible exception of a new flag for searching only the object store or both the object store and shadow object store). This would require existing applications to have their client libraries updated to support the API.

At step 510, upon determining that the operation specifies to enumerate objects in the object store, an enumeration of objects is prepared and presented. The enumeration will include objects in the object store as well as objects on the shadow object store represented by pointer objects in the object store. Therefore, when conducting an operation such as listing a folder, since archived objects have been replaced by pointers, there will still be an object to enumerate with its own ID and metadata. When an application encounters an object pointer in the object store, it can follow the reference to the shadow object store and retrieve the original metadata (in embodiments where the metadata is not included in the pointer object). When preparing the listing or enumeration, a list of objects and pointers from the object store may be prepared and presented. In some embodiments, objects represented by pointers may be marked in some way so as to clearly indicate that the items are not physically present on the object store, but rather are represented by a pointer on the object store.

At step 520, upon determining the operation specifies to retrieve an object by a unique identifier (ID), the object store is searched for an object having the unique identifier; if the object is not discovered, the shadow object store may be searched for an object having the unique identifier. The object may not be discovered in the object store because its pointer object may not have the same ID. Since an object might be located in the shadow object store, failure to find a matching ID in the object store may no longer cause issues, as the shadow object store may also be checked. If an object having the requested ID is found in the shadow object store, the corresponding custom pointer object in the object store may be returned, as the object in the shadow object store may have a pointer object pointing back to the pointer object in the shadow object store.

At step 530, upon determining the operation specifies to search for an object, the object store and the shadow object store are searched. Unlike retrieving an object by ID, which may be regarded as a special case of searching, searches are open-ended, so both object stores must always be searched in order to retrieve complete results. For example, just because the search yields results from the original object store, there may be additional results matching the criteria in the shadow object store, so both must be searched. Since the shadow object store is on slower storage, the searches may also be slower. This may be addressed through a caching mechanism, by maintaining indexes of frequently accessed attributes in the shadow object store on fast storage, or by allowing the user to choose whether to continue the search on the shadow object store.

At step 540, upon determining the operation specifies to update an object in the shadow object store, the object in the shadow object store is updated and in embodiments where properties are cached in the pointer, the pointer object in the object store is updated. Thus, all archived objects are updated in the shadow object store. If the pointer object in the object store caches properties, the step 540 would also include updating properties, as well as any additional indexes used for searching. At step 550, upon determining the operation specifies to delete an archived object, the object is deleted from the shadow object store, and the pointer object in the object store is deleted. At step 560, upon determining that the request specifies to restore an archived object, the archived object is transferred from the shadow object store to the object store, and the custom pointer object in the object store is removed. In some embodiments, the object in the shadow object store may be deleted; in some other embodiments, it may be retained for redundancy purposes. In some embodiments, a restore operation may require an access control mechanism, such as an access control list, to restrict moving between certain storage locations. The access controls may define which users can archive and restore items, especially when items are being restored to faster, more expensive storage. Therefore, if restoring content from the shadow object store to the object store would make a department go over budget, the transfer may be prohibited.

Embodiments disclosed herein therefore provide flexible archival options for end users who may quickly identify that content need not be locally stored. The online archival process disclosed herein provides scalability and flexibility, as the archived objects appear as if they have not been archived, remaining available to applications needing access to them. By choosing to archive individual files based on particular needs, faster, more expensive local storage may be saved for more objects. Additionally, slower archival space may be conserved by only archiving files which are not needed. Embodiments disclosed herein therefore promote efficient use of both the object store as well as the shadow object store. Tools may be implemented which allow administrators to determine how much storage is being used and by whom, as well as how to determine storage charges based on their use. Advantageously, the object store and shadow object store may be managed independently from each other. For example, administrators can take either storage area offline and perform needed backups without impacting access to documents in other storage areas.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A computer program product to archive data objects, the computer program product comprising:
a non-transitory computer-readable storage medium having computer-readable program code embodied therewith, the computer-readable program code executable by a processor to perform an operation comprising:
storing a first object in an object store residing in a first storage device of a client system, wherein the first object has at least one metadata attribute including a first metadata attribute comprising a filename of the first object;
responsive to receiving a user request to archive the first object to a shadow object store residing in a second storage device:
transferring the first object to the shadow object store; and
creating, in the object store, a reference to a location of the first object in the shadow object store, wherein a filename of the reference comprises the filename of the first object, wherein the first object remains accessible through the object store and the shadow object store following the transfer, wherein the shadow object store is accessible to the client system via a network, wherein the first and second storage devices have different storage speeds; and
responsive to receiving a user request to search for the first object:
searching the object store for each of: (i) an object having the at least one metadata attribute associated with the first object, and (ii) a reference to an object in the shadow object store having the at least one metadata attribute associated with the first object; and
searching for an object having the at least one metadata attribute associated with the first object in each of: (i) the shadow object store, and (ii) a cache in the shadow object store maintaining indexes.

2. The computer program product of claim 1, wherein the first object remains visible in an enumeration of objects of the object store, wherein the reference further comprises disk information specifying the location of the first object in the shadow object store and a unique identifier of the first object in the shadow object store.

3. The computer program product of claim 2, wherein the at least one metadata attribute of the first object is stored in: (i) the reference, and (ii) the shadow object store, wherein the at least one metadata attribute further comprises: (i) a size, (ii) a creation date, (iii) at least one modification date, and (iv) a creator of the first object.

4. The computer program product of claim 3, the operation further comprising:
responsive to receiving a user request to delete the first object:
deleting the first object from the shadow object store; and
deleting the reference from the object store.

5. The computer program product of claim 4, the operation further comprising:
responsive to receiving a user request to restore the first object from the shadow object store:
transferring the first object to the object store; and
deleting the reference from the object store.

6. The computer program product of claim 5, the operation further comprising:
modifying the reference responsive to receiving an indication that the first object in the shadow object store has been modified.

7. The computer program product of claim 6, wherein the object store resides on a first storage device, wherein the shadow object store resides on a second storage device, wherein the first storage device is faster than the second storage device, wherein an application attempting to access the first object from the object store follows the reference in the object store to access the first object in the shadow object store.

8. A system, comprising:
one or more computer processors; and
a memory containing a program, which, when executed by the one or more computer processors, performs an operation to archive data objects, the operation comprising:
storing a first object in an object store residing in a first storage device of a client system, wherein the first object has at least one metadata attribute including a first metadata attribute comprising a filename of the first object;
responsive to receiving a user request to archive the first object to a shadow object store residing in a second storage device:
transferring the first object to the shadow object store; and
creating, in the object store, a reference to a location of the first object in the shadow object store, wherein a filename of the reference comprises the filename of the first object, wherein the first object remains accessible through the object store and the shadow object store following the transfer, wherein the shadow object store is accessible to the client system via a network, wherein the first and second storage devices have different storage speeds; and
responsive to receiving a user request to search for the first object:
searching the object store for each of: (i) an object having the at least one metadata attribute associated with the first object, and (ii) a reference to an object in the shadow object store having the at least one metadata attribute associated with the first object; and
searching for an object having the at least one metadata attribute associated with the first object in each of: (i) the shadow object store, and (ii) a cache in the shadow object store maintaining indexes.

9. The system of claim 8, wherein the first object remains visible in an enumeration of objects of the object store, wherein the reference further comprises disk information specifying the location of the first object in the shadow object store and a unique identifier of the first object in the shadow object store.

10. The system of claim 9, wherein the at least one metadata attribute of the first object is stored in: (i) the reference, and (ii) the shadow object store, wherein the at least one metadata attribute further comprises: (i) a size, (ii) a creation date, (iii) at least one modification date, and (iv) a creator of the first object.

11. The system of claim 10, the operation further comprising:
responsive to receiving a user request to delete the first object:
deleting the first object from the shadow object store; and
deleting the reference from the object store.

12. The system of claim 11, the operation further comprising:
responsive to receiving a user request to restore the first object from the shadow object store:
transferring the first object to the object store; and
deleting the reference from the object store.

13. The system of claim 12, the operation further comprising:
modifying the reference responsive to receiving an indication that the first object in the shadow object store has been modified.

14. The system of claim 13, wherein the object store resides on a first storage device, wherein the shadow object store resides on a second storage device, wherein the first storage device is faster than the second storage device, wherein an application attempting to access the first object from the object store follows the reference in the object store to access the first object in the shadow object store.

* * * * *